United States Patent [19]
Bogard et al.

[11] Patent Number: 4,961,898
[45] Date of Patent: Oct. 9, 1990

[54] REACTOR INTERNALS AND CORE SUPPORT MONITORING SYSTEM

[75] Inventors: William T. Bogard, Irwin; George J. Bohm, Pittsburgh; William Ciaramitaro; Sam S. Palusamy, both of Murrysville; Norman R. Singleton, Pittsburgh; John A. Tgortorice, Export, all of Pa.

[73] Assignee: Westinghouse Electric Corp., Pittsburgh, Pa.

[21] Appl. No.: 238,051

[22] Filed: Aug. 30, 1988

[51] Int. Cl.$^5$ .............................................. G21C 17/00
[52] U.S. Cl. .................................................. 376/245
[58] Field of Search ............... 376/245, 249, 259, 258; 73/579, 590

[56] References Cited

U.S. PATENT DOCUMENTS

| | | | |
|---|---|---|---|
| 3,860,480 | 1/1975 | Carteus et al. | 376/245 |
| 3,860,481 | 1/1975 | Gopal et al. | 376/245 |
| 4,060,716 | 11/1977 | Pekrul et al. | 376/259 |

Primary Examiner—Daniel D. Wasil
Attorney, Agent, or Firm—E. F. Possessky

[57] ABSTRACT

A nuclear reactor monitoring system includes incore and excore neutron detectors for producing neutron noise signals and system data including at least one of reactor coolant pump motor current, temperature and pressure of the reactor coolant system and pressurizer pressure and means for diagnosing conditions of the reactor internals and core support structures by comparing analyzed instrumentation signatures. The signatures may be derived from scale model test data, plant test data, analytical model results and trending analysis results. Analyses performed by the system include time and frequency domain analyses of the neutron noise signals and the system data. The analyzed data are compared with rules in a rules base of an expert system to generate a diagnosis of the condition of the reactor internals and core support structures and action recomendations for maintenance of the nuclear reactor.

12 Claims, 2 Drawing Sheets

REACTOR INTERNALS AND CORE SUPPORT MONITORING SYSTEM

BACKGROUND OF THE INVENTION

1. Field of the Invention

The present invention is related to monitoring of a nuclear reactor and, more particularly, to a system for monitoring and diagnosing abnormalities within a nuclear reactor pressure vessel.

2. Description of the Related Art

A variety of monitoring is conventionally performed on nuclear reactors for early detection of degradations to minimize plant outages. Examples of such monitors can be found in U.S. Pat. Nos. 3,860,480 and 3,860,481, both assigned to the assignee of this invention. These patents are directed respectively to analysis of the vibration of core components as indicated by analysis of the noise content of neutron flux signals and a loose parts monitor using accelerometers mounted on the exterior surfaces of primary system components where metal particles are likely to accumulate. Many other types of monitoring systems are used on a typical nuclear reactor. Some systems include analysis of the signals, while others simply consist of a sensor, a recorder and communication means for supplying the signals detected by the sensor to the recorder.

Thus, there is a great deal of information about the operation of components and systems generated for a typical nuclear reactor. However, there are relatively few monitoring systems which analyze the available data to determine possible causes of changes in signals. As a result, nuclear reactor plants used for, e.g., electricity generation, experience unplanned outages when components fail or approach failure, despite the information provided by existing monitoring systems.

SUMMARY OF THE INVENTION

An object of the present invention is to provide a monitoring system for identifying signal signatures indicative of structural abnormalities.

Another object of the present invention is to provide a monitoring system for diagnosing system abnormalities prior to failure.

Yet another object of the present invention is to reduce the number of unplanned outages.

A further object of the present invention is to provide maintenance scheduling recommendations based upon the existence of signal signatures in the signals detected by monitoring a nuclear reactor.

A still further object of the present invention is to extend the life of a nuclear reactor by appropriately scheduling maintenance.

The above objects are attained by providing a method for diagnosing conditions of reactor internals and core structures in a nuclear reactor, comprising the steps of: detecting vibration of reactor internals and automatically evaluating the vibration of the reactor internals based upon system data including at least one of pressurizer pressure, reactor coolant pump motor current, reactor coolant system pressure, reactor coolant system temperature and reactor coolant system flow rate, to diagnose the condition of the reactor internals and core support structures. Structural data, including at least one of displacement, acceleration and strain of the reactor vessel or reactor internals, may also be used in evaluating the reactor internal vibration. Analysis techniques for evaluating the data include auto and cross power spectral density functions, cepstrum analysis, Duhamel's theorem and other frequency and time domain statistical properties.

Preferably, the data is evaluated using an expert system defining a relationship between structural abnormalities and signatures of the system data and the neutron activity to produce a diagnosis of the condition of the reactor internals and core structures.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
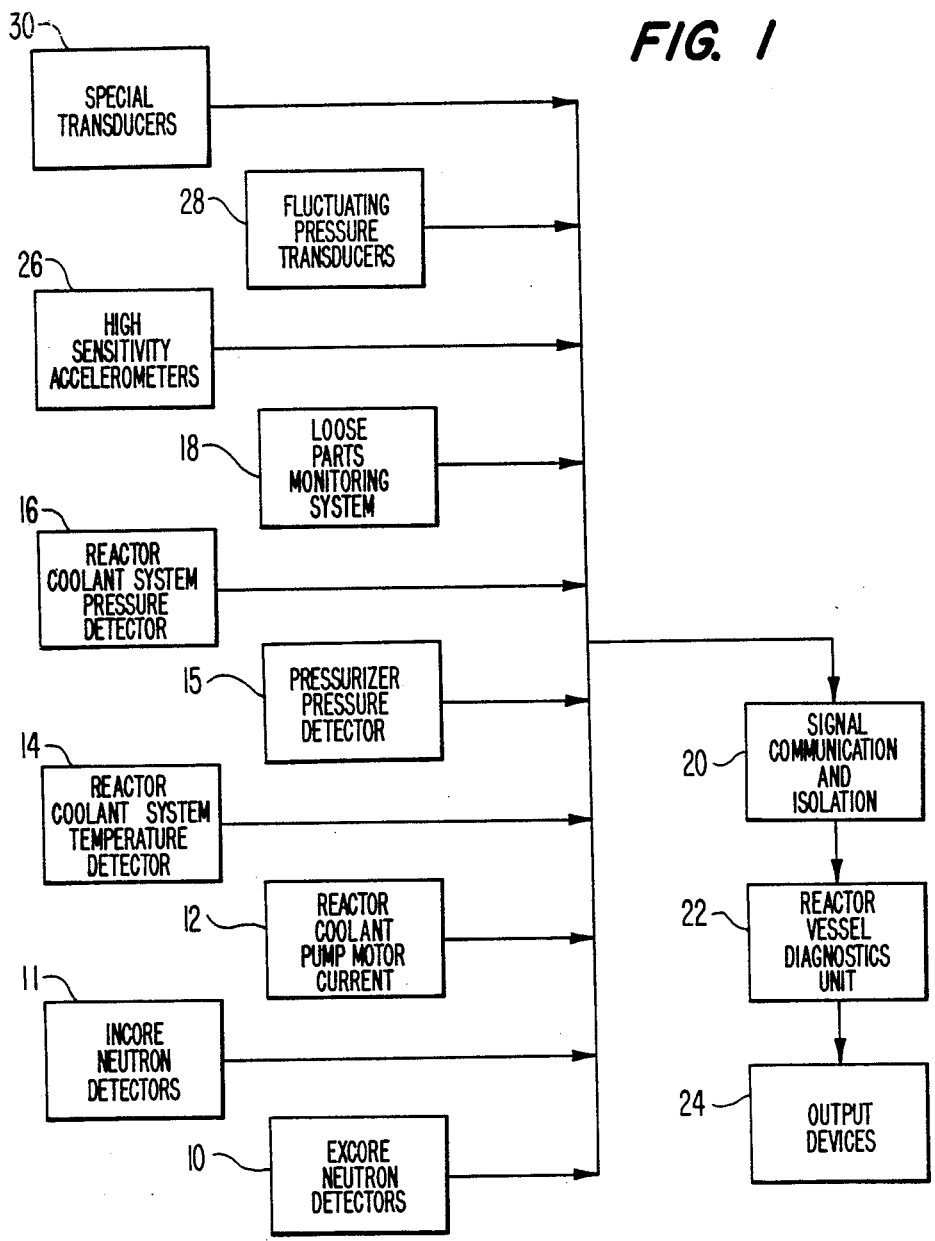
FIG. 1 is a block diagram of a monitoring system according to the present invention.

As nuclear reactors used for electricity generation have become older, there has been increasing interest with predicting failure of components to extend the life of such plants and minimize unplanned outages required for repairs. Deterioration in components such as loss of integrity of thermal shield supports, cracking in guide tube support pins, loss of preload in the core barrel hold down spring, fuel rod wear induced by flow and influenced by internal responses, upper internals flow induced vibration and reactor core misalignment are examples of reactor internals degradation which have been experienced. In some cases, deterioration of this sort has lead to significant unplanned outages. Although monitoring may not reduce or prevent deterioration, useful information can be provided on recommended modes of operation and timing of repair and replacement of components. The reduction of unplanned outages can provide significant savings, several times the cost of a monitoring system according to the present invention.

These savings are possible by the use of detectors currently in place at most nuclear power plants along with additional instrumentation if justified. A typical plant includes excore 10 and incore 11 neutron detectors, a reactor coolant pump motor current detector 12 and temperature detectors 14. Usually, pressure sensors 15, 16 also exist at nuclear power plants to measure pressurizer pressure 15 and reactor coolant system pressure 16. In addition, a loose parts monitoring system 18 like that described in U.S. Pat. No. 3,860,481 is commonly found at nuclear power plants.

However, the sensors used in these systems are simply connected to recorders or, as described in U.S. Pat. Nos. 3,860,480 and 3,860,481 used only to evaluate the data from a single type of sensor. According to the present invention, signals from the excore and incore neutron detectors 10, 11 are supplied together with at least one of the other sensors via signal communication and isolation means 20 to a reactor vessel vibration diagnostics unit 22. The signal communication and isolation means 20 may be provided by conventional cabling or the system described in U.S. application Ser.

No. 934,238 filed Nov. 20 1987, now U.S. Pat. No. 4,770,842 and conventional conditioning and isolation circuitry. The reactor vessel diagnostics unit 22 outputs the results of analysis performed as described below on conventional output devices 24, such as computer displays, printers, plotters, etc.

In addition to the detectors which are currently installed at most operating nuclear power plants, other transducers can be used to provide additional information to help diagnose specific conditions. For example, rugged, high sensitivity accelerometers 26 and fluctuating pressure transducers 28 can be added to provide information about small or quick vibrations and pressure fluctuations. Other special transducers 30, such as displacement detectors might be mounted between components to detect relative displacement, e.g., within the reactor vessel. Several transducers of different types are typically mounted during the pre-operational testing of a nuclear power plant and then removed. Longer life sensors of similar type and in similar locations may be used to provide information in addition to or in lieu of that provided by existing sensors.

The reactor vessel diagnostics unit 22 may consist of conventional hardware running software as described below. The hardware in the reactor vessel diagnostic unit 22 may be a conventional microcomputer or minicomputer with conventional interfaces to the signal communication and isolation means 20 and output devices 24. For example, an IBM PC AT with 640 kilobytes of memory, floppy disks, removable magnetic media, IEEE, parallel and serial interfaces, a monitor, a keyboard, a printer and a plotter in a nonseismic cabinet may be used to evaluate the vibration of the reactor internals indicated by the neutron activity detected by the excore and incore neutron detectors 10, 11 and system data including at least one of pressurizer pressure, reactor coolant pump motor current, reactor coolant system pressure, reactor coolant system temperature and reactor coolant system flow rate, to diagnose the condition of the vibration of the reactor internals and core structures. In addition, the vibration of the reactor internals may be evaluated based upon structural data including at least one of displacement, acceleration and strain of the core support structures if some of the additional sensors 26, 28 and 30 have been installed.

Figure 2:
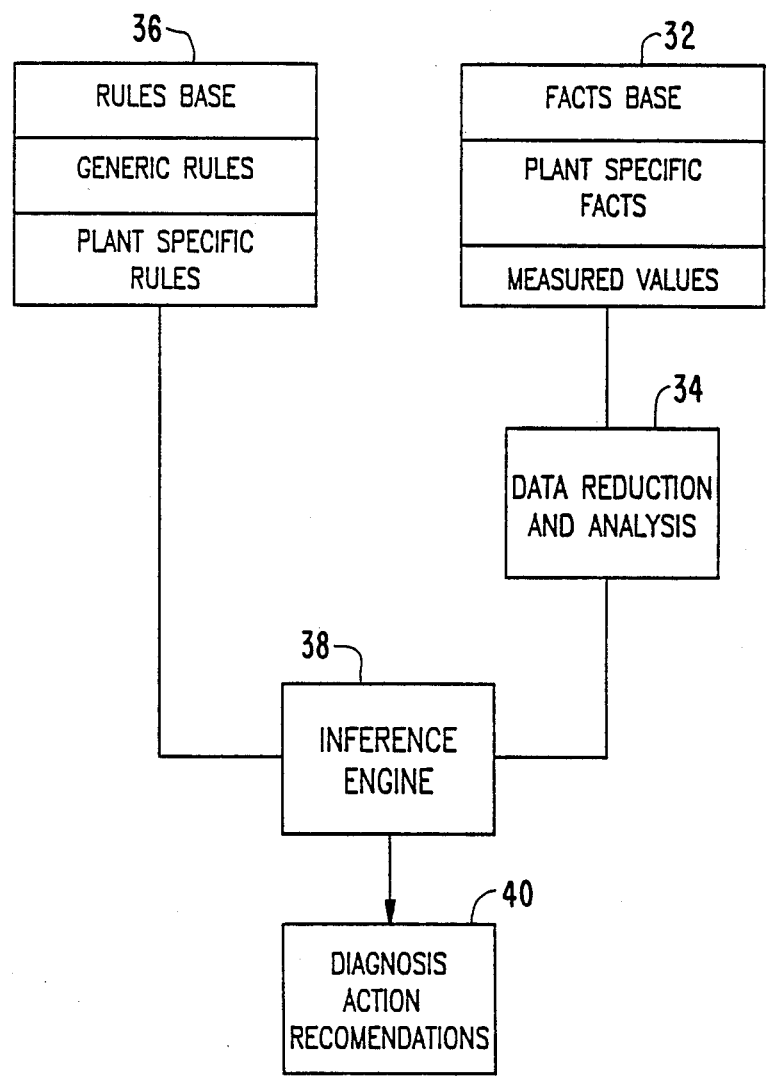
FIG. 2 is a block diagram of an expert system used to perform diagnostics in the monitoring system illustrated in FIG. 1.

The software executed by the reactor vessel diagnostic unit 22 preferably includes an expert system which automatically evaluates vibration of the reactor internals and the system data to establish whether the data indicates normal or abnormal behavior and, if the latter, to identify a possible cause of the behavior. As illustrated in FIG. 2, data supplied via the signal communication and isolation means 20 is stored as measured values in facts base 32. Also included in the facts base may be constant plant specific facts input by keyboard or other means. The data stored in the facts base 32 undergoes data reduction and analysis 34. This data reduction and analysis preferably includes generating dimensionless internal vibration indicators and system indicators from the neutron activity and system data, respectively. These indicators may be generated by comparing the measured values with baseline data obtained by sampling data over a period of time from one or more operating nuclear reactors. Using the standard deviation of the baseline data for each of the signals received via the signal communication and isolation means 20, the indicators can then be assigned a value of, e.g., normal, high, very high, low or very low, by comparing the difference between the measured values stored in the facts base 32 with the baseline data stored as part of the plant specific data in the facts base 32. In other words, if a measured value exceeds the corresponding baseline data by between one and two standard deviations, the indicator for that sensor would be high, and if more than two standard deviations, very high. Similarly if the indicator for a value is one to two standard deviations lower than the baseline data for that sensor, then the indicator would be low and if more than two standard deviations lower, the indicator would be very low. Otherwise, the indicator would be normal.

Use of indicators of this sort permits a number of the rules stored in a rules base 36 to be generic rules. Plants specific rules for specific types of instrumentation or known operating characteristics may also be stored in the rules base 36. The facts stored in the facts base 32 and the rules stored in the rules base 36 may be derived in a known manner from scale model tests, plant test data, analytical model results, trending analysis results and other known techniques.

The data reduction and analysis 34 includes both frequency and time domain analysis and may include applying one or both of auto and cross power spectral density functions to the reactor internal vibration and system data. Where structural data from additional sensors 26, 28 or 30 is available, the auto and cross power spectral density functions can also be applied to the vibration of the reactor internals and structural data. Other forms of data analysis, such as cepstrum analysis of the neutron activity and one or more of the pressurizer pressure, reactor coolant pump motor current, reactor coolant system pressure and displacement, acceleration and strain of the core structures or application of Duhamel's theorem to the temperature of the reactor coolant system can also be used.

All of the data analysis techniques described above are known methods for analyzing data. By applying these or other data analysis techniques to sample data from operating reactors, signatures of specific conditions within the reactor vessel can be identified. In addition, model testing may be done where known types of deterioration are introduced into the model and the resulting signatures are recorded. These signatures and their causes can then be stored as rules in the rules base 36.

For example, the core support structures in a nuclear reactor include a core barrel support. The reactor internal vibration obtained from analysis of the neutron activity, e.g., in the manner described in U.S. Pat. No. 3,860,480, can be converted to the frequency domain by a fast Fourier transform to identify a frequency domain statistical property of the neutron activity in the form of an internal vibration indicator corresponding to the frequency spectrum of the neutron activity. If the frequency domain statistical property of the neutron activity exceeds a value predetermined by analysis of signatures from sample data, then a diagnosis may be made indicating the possibility of deterioration of the core barrel support.

As another example, an additional sensor may be installed to detect displacement of the core barrel. In data reduction and analysis 34, a time domain statistical property of the reactor coolant temperature can be compared with a first value determined from sample data. If the time domain statistical property of the reactor coolant temperature exceeds the first value and the displacement of the core barrel indicated by the vibration of the reactor internals or the additional sensor is in excess of a second value, then a diagnosis may be made that a hydraulic anomaly, such as vortex shedding, is likely occurring.

The rules from the rules base 36 and indicators output from the data reduction analysis 34 are evaluated by an inference engine 38 in the manner described above. The inference engine 38 may be a conventional expert system shell such as Texas Instruments' Personal Consultant Plus for the IBM PC. As indicated by the above examples, the rules can be used to produce a diagnosis of conditions of the reactor internals and core structures within the reactor vessel. Additional rules stored in the rules base 36 can provide recommendations for repair and replacement at the time of planned outages to avoid unplaned outages. For example, if deterioration of the core barrel support is diagnosed, the core barrel support could be identified as needing repair or replacement during a reloading of the reactor fuel. Thus, a diagnosis and action recommendations 40 are output from the inference engine 38.

The many features and advantages of the present invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed:

1. A method for diagnosing conditions of reactor internals and core support structures in a nuclear reactor, comprising the steps of:
    (a) detecting vibration of reactor internals;
    (b) receiving signals representing system data including at least two among pressurizer pressure, reactor coolant pump motor current, reactor coolant system pressure, reactor coolant system temperature and reactor coolant system flow rate; and
    (c) automatically evaluating the vibration of the reactor internals detected in step (a) based upon all of the signals received in step (b) to diagnose the condition of the reactor internals and core support structures.

2. A method as recited in claim 1,
    further comprising the step of (d) automatically evaluating the vibration of the reactor internals based upon structural data including at least one of displacement, acceleration and strain of the core support structures, and
    wherein step (c) comprises the steps of:
    (ci) analyzing neutron activity emanating from the core of the nuclear reactor using cepstrum analysis to produce an internal vibration indicator;
    (cii) analyzing the system data using cepstrum analysis on at least one of the pressurizer pressure, reactor coolant pump motor current, reactor coolant system pressure and displacement, acceleration and strain of the core support structures to produce a system indicator of reactor operation; and
    (ciii) comparing the system and internal vibration indicators with rules defining a relationship between structural abnormalities and signatures of the system data and the neutron activity to produce a diagnosis of the condition of the reactor internals and core support structures.

3. A method as recited in claim 2, wherein step (cii) further comprises applying analysis using Duhamel's theorem to the temperature of the reactor coolant system in producing the system indicator of reactor operation.

4. A method as recited in claim 1, wherein the signals received in step (b) represent the system data including at least the pressurizer pressure, the reactor coolant pump motor current, the reactor coolant system pressure, the reactor coolant system temperature and the reactor coolant system flow rate.

5. A system for diagnosing conditions of reactor internals and core support structures in a nuclear reactor, comprising:
    monitoring means for detecting vibration of reactor internals and for obtaining system data by detecting at least two of pressurizer pressure, reactor coolant pump motor current, reactor coolant system pressure, reactor coolant system temperature and reactor coolant system flow rate; and
    diagnosis means for automatically evaluating the vibration of the reactor internals based upon the system data to diagnose the condition of the reactor internals, and the core support structures.

6. A system as recited in claim 5, wherein said monitoring means comprises:
    neutron detectors for detecting neutron activity emanating from the core of the nuclear reactor; and
    at least two of:
        a current detector for detecting the reactor coolant pump motor current;
        a temperature detector for detecting the reactor coolant system temperature; and
        pressure detectors for detecting the pressurizer pressure and the reactor coolant system pressure.

7. A system for diagnosing conditions of reactor internals and core support structures in a pressurized water nuclear reactor having a reactor vessel and a reactor coolant system with a temperature and pressure maintained by a reactor coolant pump motor, said system comprising:
    neutron detectors for outputting a first signal indicative of neutron activity emanating from the core of the nuclear reactor;
    a current detector for outputting a second signal indicative of current drawn by the reactor coolant pump motor;
    a temperature detector for outputting a third signal indicative of the temperature of the reactor coolant system;
    pressure detectors for outputting fourth and fifth signals indicative of pressurizer pressure and the pressure of the reactor coolant system;
    signal communication and isolation means for transmitting the first, second, third, fourth and fifth signals; and
    a reactor vessel diagnostic unit, connected to said signal communication and isolation means, for analyzing the neutron activity, the temperature, pressure and flow rate of the reactor coolant system, the pressure of the pressurizer and the current of the reactor coolant pump motor and for diagnosing the condition of the reactor internals and core support structures by comparing the results from the analysis with predetermined system data.

8. A system as recited in claim 7, further comprising at least one of:

a flowmeter for outputting a sixth signal indicative of the flow rate of the reactor coolant system;

an accelerometer for measuring motion of at least one of the reactor vessel, reactor vessel internals and a dynamically coupled reactor coolant system component to produce a seventh signal;

a displacement detector for measuring displacement of at least one of the reactor vessel, the reactor vessel internals and the dynamically coupled reactor coolant system component to produce an eighth signal; and a strain gauge for measuring strain in at least one of the reactor vessel, reactor vessel internals and the dynamically coupled reactor coolant system component to produce a ninth signal, and wherein said signal communication and isolation means transmits and said reactor vessel diagnostic unit analyzes at least one of the sixth, seventh and eighth signals.

9. A system as recited in claim 8, wherein said reactor vessel diagnostic unit includes means for producing a maintenance scheduling recommendation in dependence upon the condition of the reactor internals and core support structures.

10. A system as recited in claim 8, wherein said signal communication and isolation means transmits and said reactor vessel diagnostic unit analyzes unit analyzes the data represented by all of the first through ninth signals.

11. A method for diagnosing conditions of reactor internals and core support structures in a nuclear reactor having components, comprising the steps of:

(a) receiving sensor data indicating operational states at least two of the components of the nuclear reactor, the sensor data including excore and incore neutron detector noise signals; and (b) analyzing the sensor data in comparison with scale model test data, full scale plant test data, analytical model results and trending analysis results to diagnose the conditions of the reactor internals and the core support structures.

12. A method as recited in claim 11, wherein step (b) comprises applying expert system rules defined using signal signatures derived from the test data and the analytical model and trending analysis results to identify degradation mechanisms of the reactor internals and the core support structures.

* * * * *